C. A. RICKARDS.
WATER BOTTLE, STOPPER, AND HEATING ATTACHMENT.
APPLICATION FILED APR. 16, 1909.
1,174,179.
Patented Mar. 7, 1916.
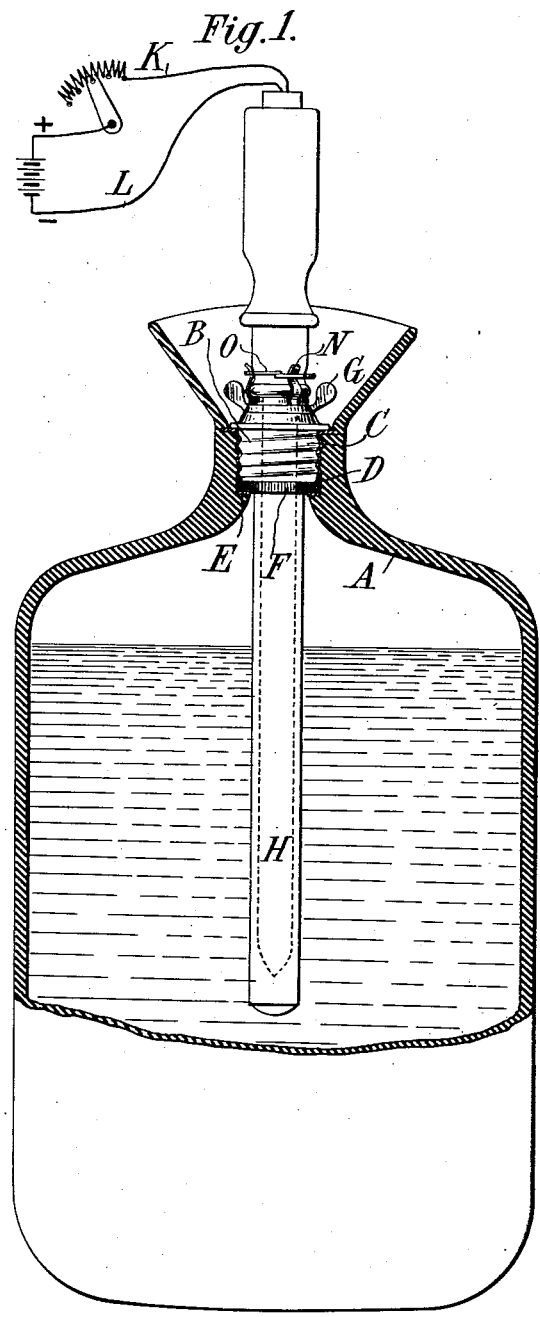
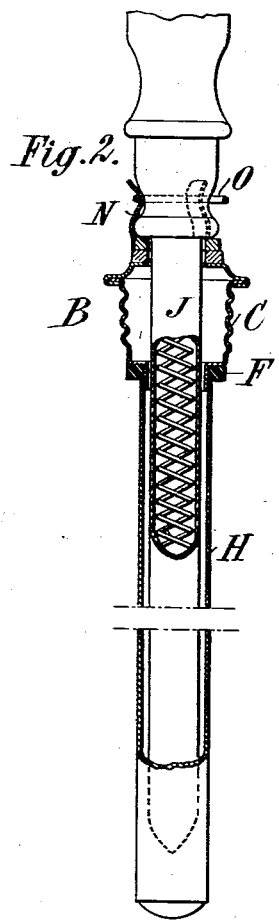
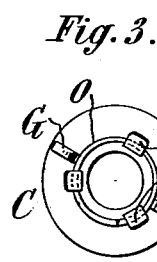
WITNESSES:
Fred White
René Bruine
INVENTOR:
Clara A. Rickards,
By Attorneys,

UNITED STATES PATENT OFFICE.

CLARA A. RICKARDS, OF CHICAGO, ILLINOIS, ASSIGNOR TO A. SCHRADER'S SON, INCORPORATED, OF NEW YORK, N. Y., A CORPORATION OF NEW YORK.

WATER-BOTTLE, STOPPER, AND HEATING ATTACHMENT.

1,174,179.  Specification of Letters Patent.  Patented Mar. 7, 1916.

Application filed April 16, 1909. Serial No. 490,381.

*To all whom it may concern:*

Be it known that I, CLARA A. RICKARDS, a citizen of the United States, residing in Chicago, in the county of Cook and State of Illinois, have invented certain new and useful Improvements in Water-Bottles, Stoppers, and Heating Attachments, of which the following is a specification.

This invention relates more especially to certain improvements in water bottle stoppers, or the like, although it is susceptible of use in connection with other devices which will be hereinafter referred to.

In the use of hot water bottles it is often desirable to maintain an even temperature of the water within the bottle. This cannot ordinarily be done with the devices now in use since the initial heat of the water is more or less rapidly dissipated. According to my invention I provide a heating attachment extending within the bag or bottle which preferably is capable of being adjusted to varying degrees of heat.

Specifically considered my invention in its preferred form includes a water bottle stopper having a screw-thread or other means connecting it with a water bottle or the like, and an elongated hollow extension at its inner side projecting within the bottle, and into which the heating member may be introduced. Such heating member may consist of merely a heated iron, but preferably it is provided with some means for maintaining its heat, such as a resistance coil connected with a source of electricity.

In the accompanying drawings illustrating my invention,—Figure 1 is a sectional view of a hot water bag showing one form of the invention in elevation. Fig. 2 is a sectional view of the stopper illustrated in Fig. 1. Fig. 3 is a top plan view slightly enlarged, of the stopper illustrated in Fig. 2.

Referring to the embodiment of the invention illustrated, let A indicate a hot water bag of any suitable form and B the stopper. The latter's general form resembles the ordinary Schrader stopper; that is to say, it is provided with a screw-threaded wall C adapted to screw into a socket member D vulcanized or otherwise secured to the neck of the bag. The socket member D is formed at its lower end with a seat E, against which a packing washer F carried by the stopper B is pressed to make a tight joint. The stopper B is also provided with a suitable handle G by which it may be screwed or unscrewed.

According to my invention the stopper is made with its body portion hollow; that is to say, there is a clear passage through such body portion as best seen in Fig. 2. This passage is closed on the lower side of the stopper by the tubular extension H, the upper end of which is connected to the stopper body by brazing or otherwise, while the lower end of the extension is closed as shown. This construction provides an elongated passage leading to the interior of the bag, into which passage a heating medium may be introduced. Such heating medium may, as before stated, be merely a heated iron of suitable shape, which may be re-heated at suitable intervals to maintain a more or less even temperature of the water within the bag. Preferably, however, I provide an electrically-heated member, such as that shown at J, said member consisting of a hollow structure having within its interior a resistance coil which is connected by wires K, L to any suitable source of electric current, preferably the ordinary incandescent lighting circuit, in which case a screw plug adapted to fit a lamp socket is used. By preference some means may be employed for holding the heating device in place, such for instance as the spring arms N, which are preferably connected by a spring ring O adapted to increase the spring tension and limit the outward movement of the arms. Other means may be employed for holding the heating member within the stopper if desired.

In use the bag may be initially filled with water at the desired temperature, and the heater introduced within the stopper, and the current turned on. If desired a simple form of rheostat (such as is shown) may be introduced into the heating circuit, and the degree of heat adjusted thereby. This, however, will not ordinarily be necessary since the current may be readily turned on and off, and when it is found that the water is cooling a few moments' operation of the heater will restore it to the proper temperature.

It is apparent that the device herein described is not limited in its use to hot water bags or bottles. For instance the device without any modification is susceptible of use as a heating medium for milk or other liquid food for infants. For this purpose the extension H together with the heating member need only be inserted in the ordinary nursing or other bottle, and the current turned on. If desired, the stopper body C may be differently shaped to fit other shapes of bottle necks than that shown.

It will be apparent that many changes may be made in the construction illustrated without departing from the invention.

What I claim is:—

1. A removable stopper for a bottle, bag or the like, having a normally open passage through its body portion, and having at its inner end an elongated extension, adapted to extend within the bottle or bag, and having a hollow interior adapted to removably receive a heating device introduced through said passage, and to constitute a stopper for the bag irrespective of the presence of said heating device.

2. A removable stopper for a bottle, bag or the like, having an open passage through its body portion, and having at its inner end an elongated extension, adapted to extend within the bottle or bag, and having a hollow interior adapted to receive an independent heating device introduced through said passage, said stopper having a means for removably retaining said heating device when inserted therein.

3. A removable stopper for a bottle, bag or the like, having an open passage through its body portion, and having at its inner end an elongated extension, adapted to extend within the bottle or bag, and having a hollow interior adapted to receive a heating device introduced through said passage, said stopper having a means for removably retaining said heating device when inserted therein, said means comprising spring arms adapted to engage said device.

4. The combination of a water bag or the like, a removable stopper therefor adapted to close the bag, said stopper having a closed chamber adapted to receive a heating device, and a heating device adapted to be introduced into said chamber and removed therefrom when said stopper is in its closed position.

5. The combination of a water bag or the like, a removable stopper therefor, and a heating element adapted to be inserted into and withdrawn from said stopper while said stopper is in position in the water bag, said stopper having a normally open passage through its body portion and having at its inner end an elongated extension adapted to extend within the bag and having a hollow interior adapted to removably receive a heating device introduced through said passage.

In witness whereof, I have hereunto signed my name in the presence of two subscribing witnesses.

CLARA A. RICKARDS.

Witnesses:
  EUGENE V. MYERS,
  THEODORE T. SNELL.